March 1, 1927.
J. F. JOY
LOADING MACHINE
Filed Aug. 2, 1924
1,619,260
12 Sheets-Sheet 1
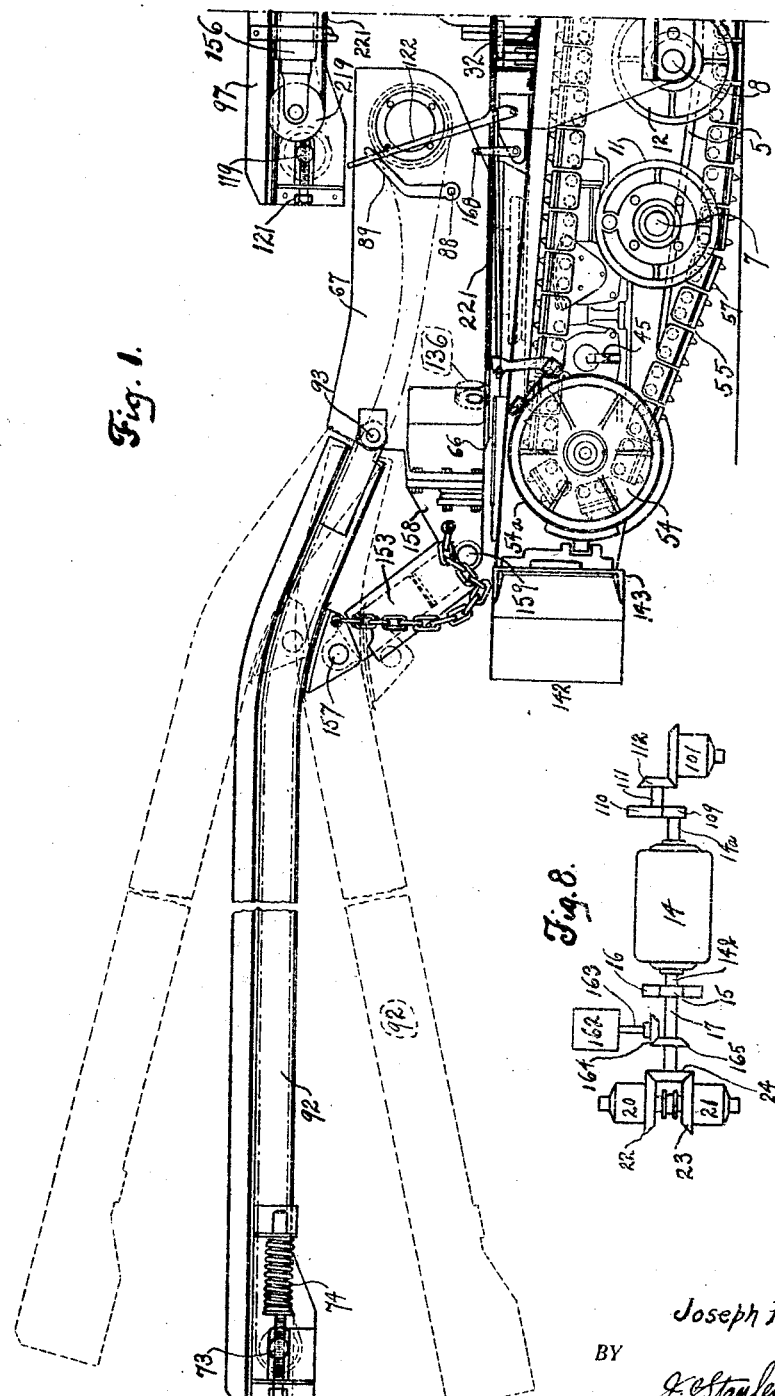
INVENTOR.
Joseph F. Joy
BY
J. Stanley Burch
ATTORNEY.

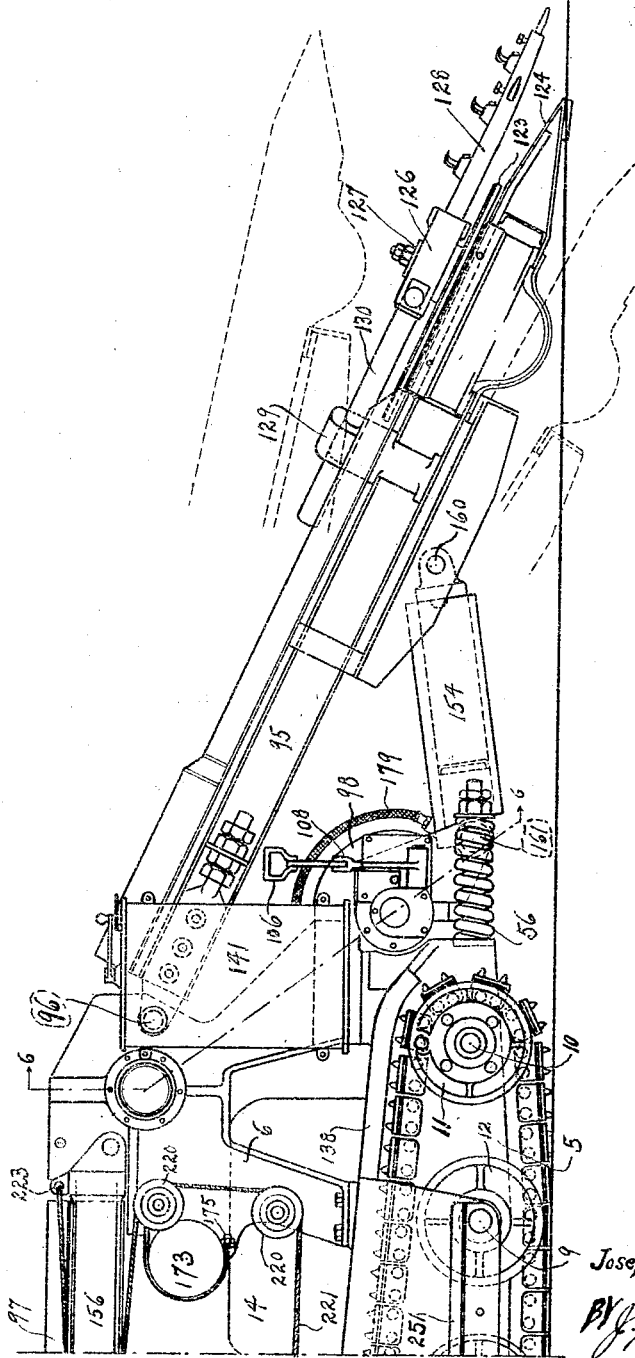

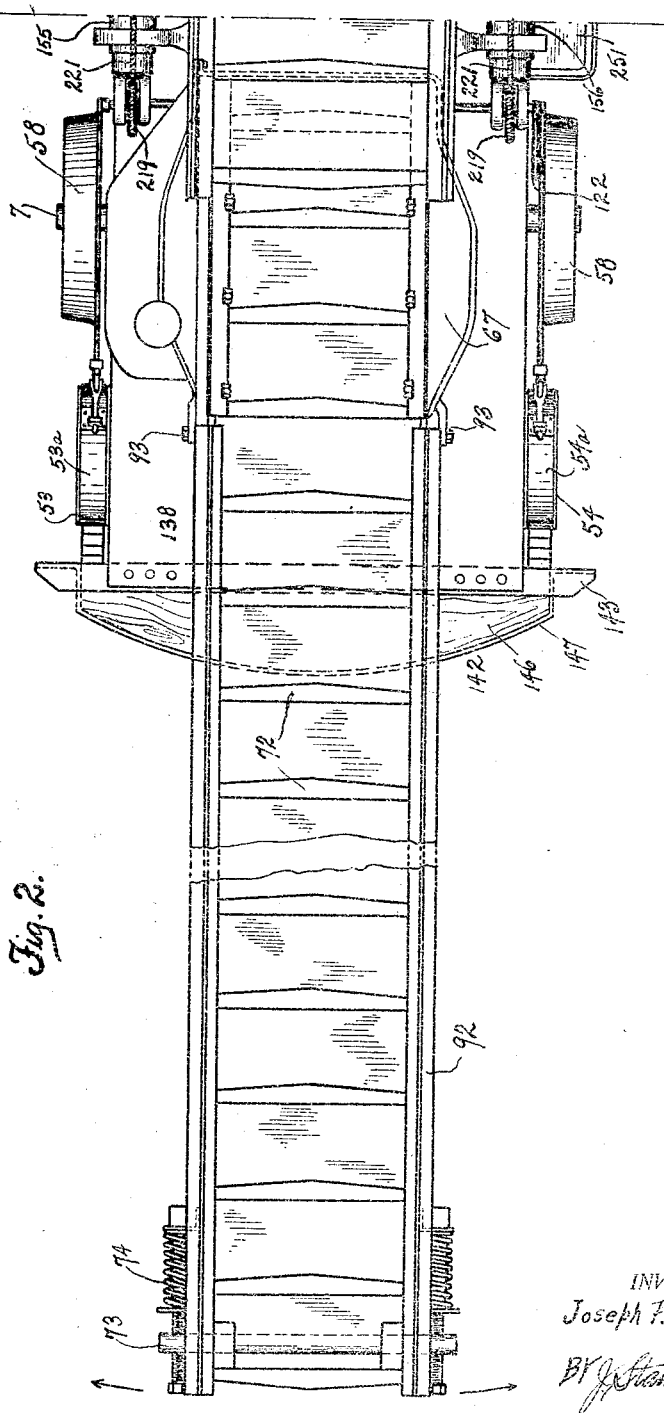

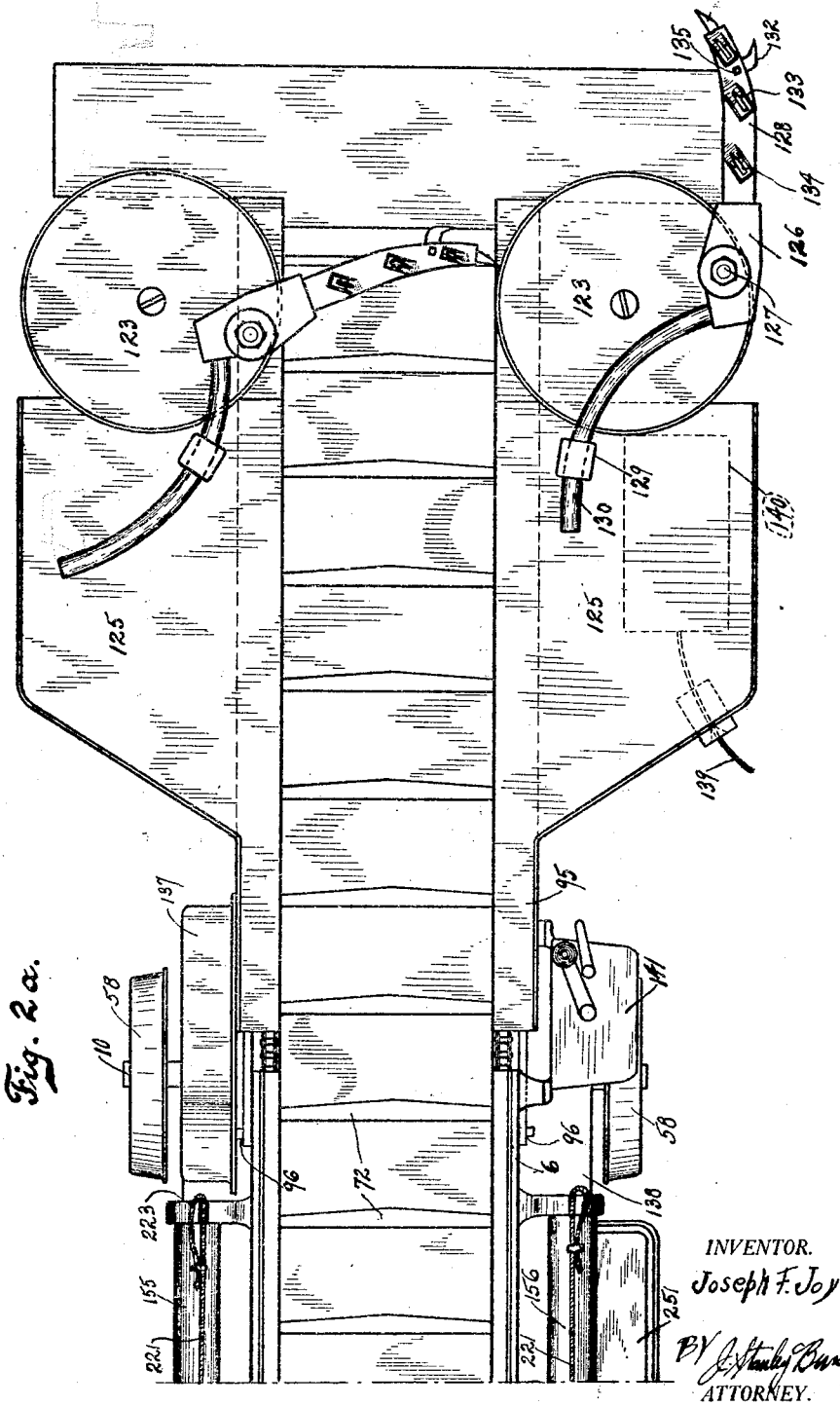

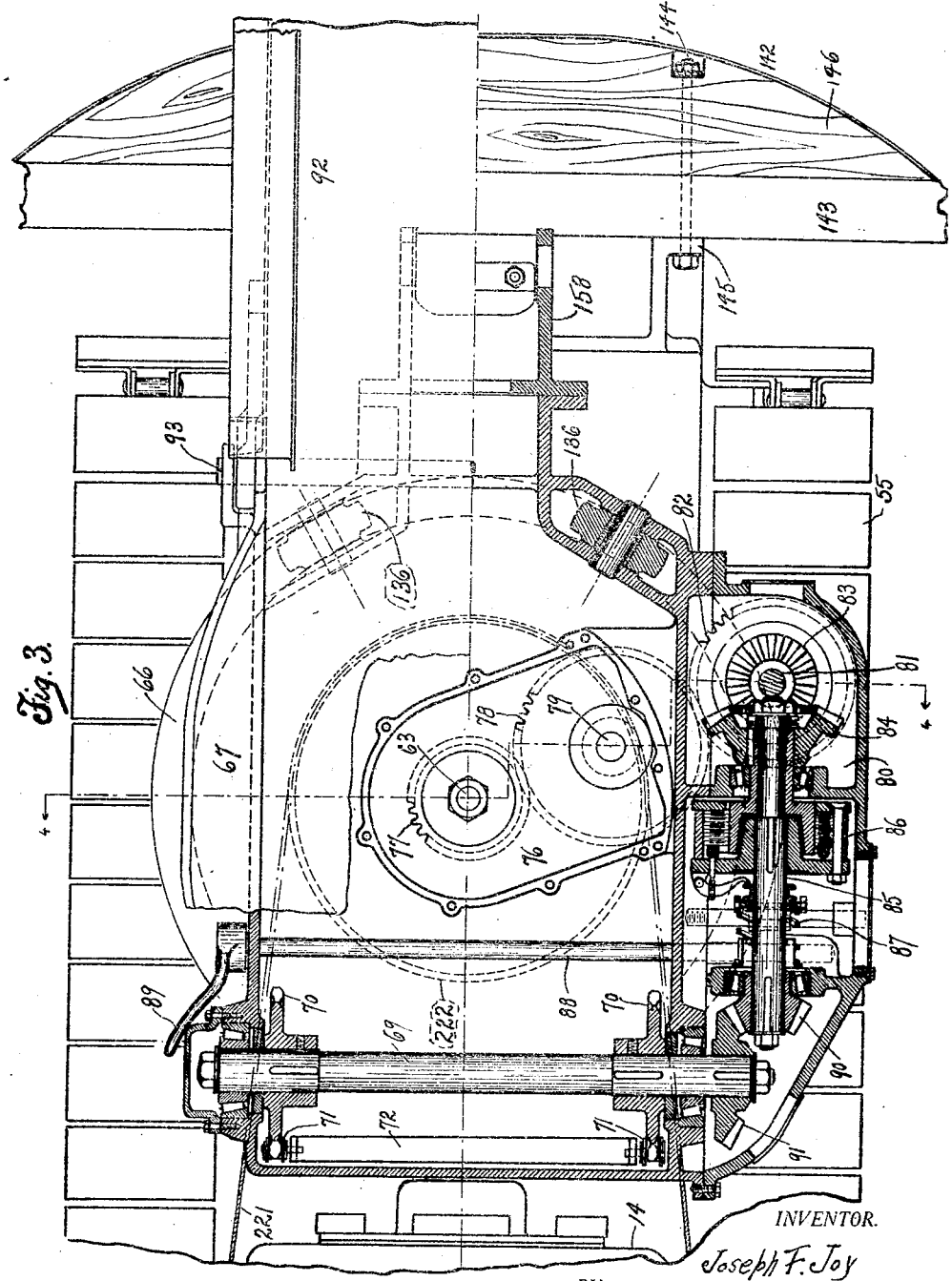

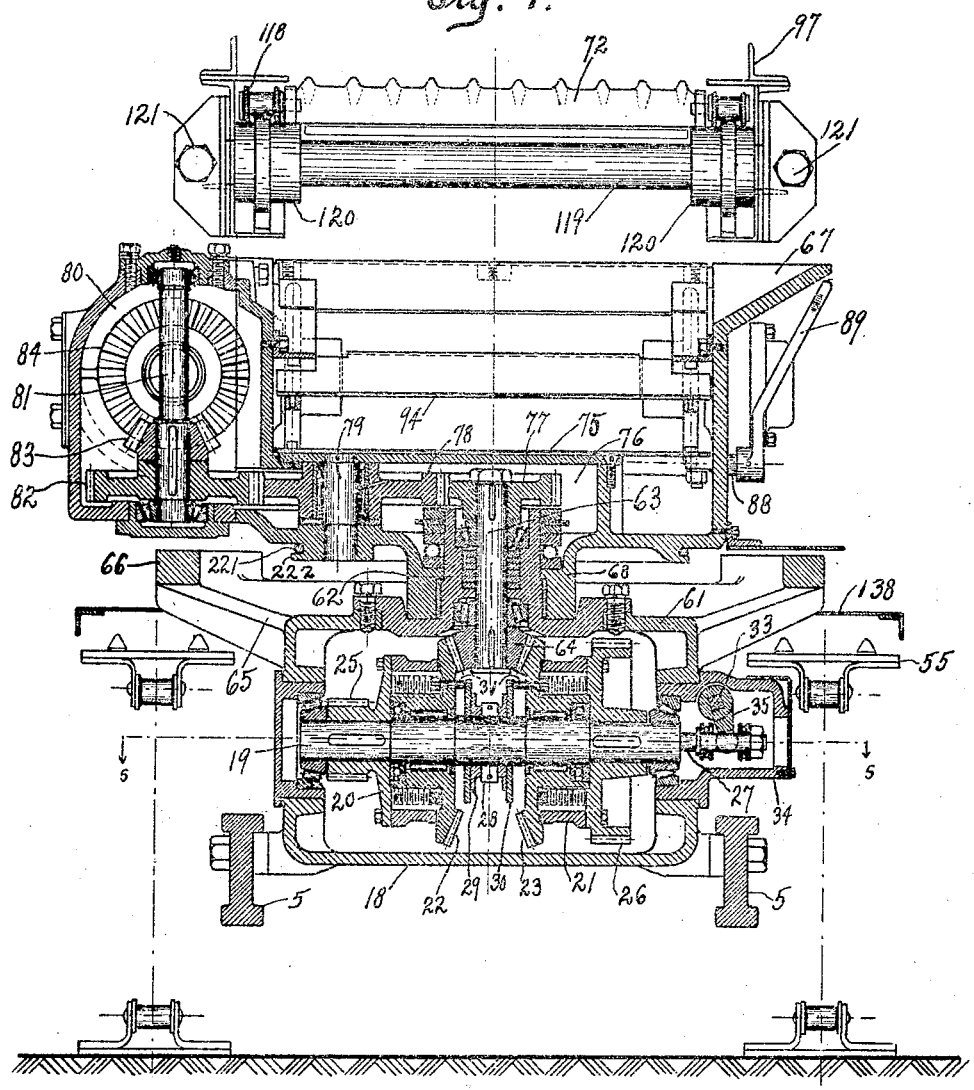

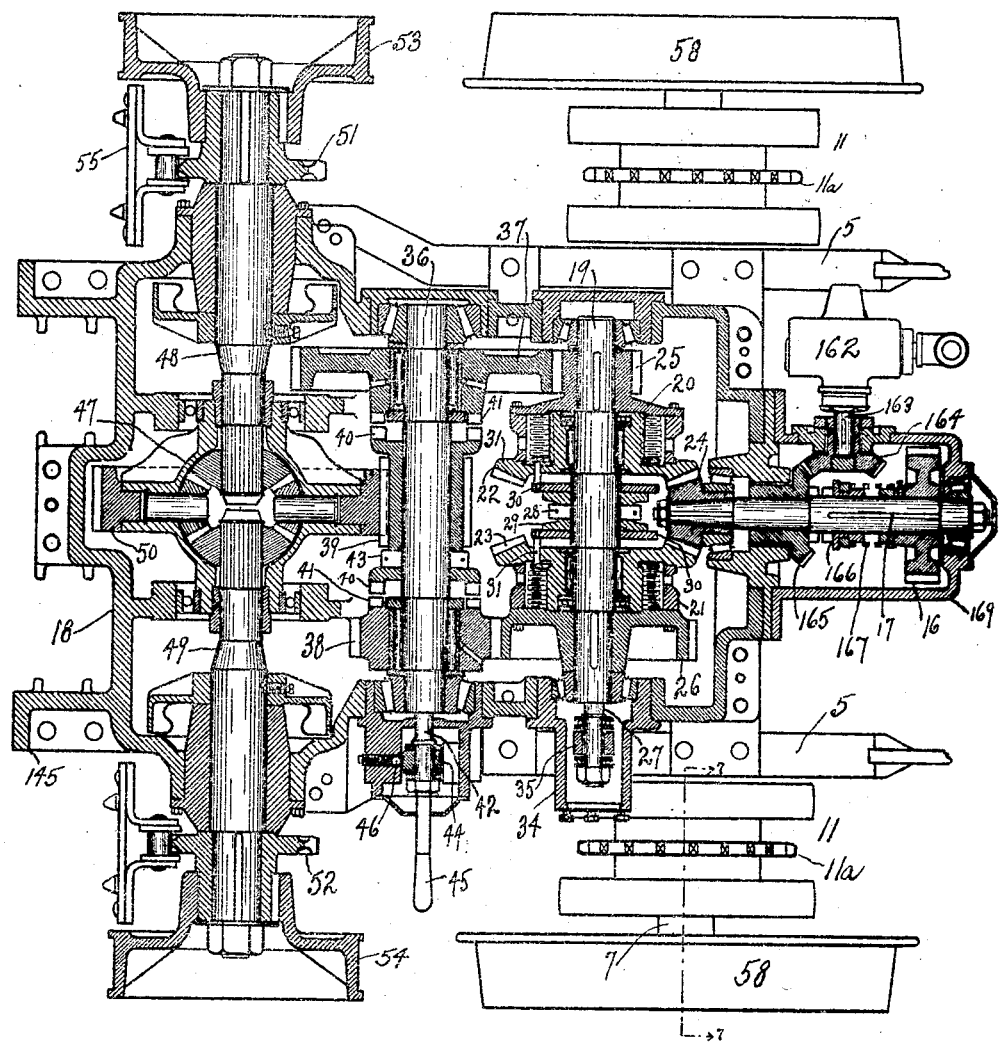

March 1, 1927. 1,619,260
J. F. JOY
LOADING MACHINE
Filed Aug. 2, 1924 12 Sheets-Sheet 8

INVENTOR.
Joseph F. Joy
BY J. Stanley Bunch
ATTORNEY.

March 1, 1927.
J. F. JOY
1,619,260
LOADING MACHINE
Filed Aug. 2, 1924     12 Sheets-Sheet 9
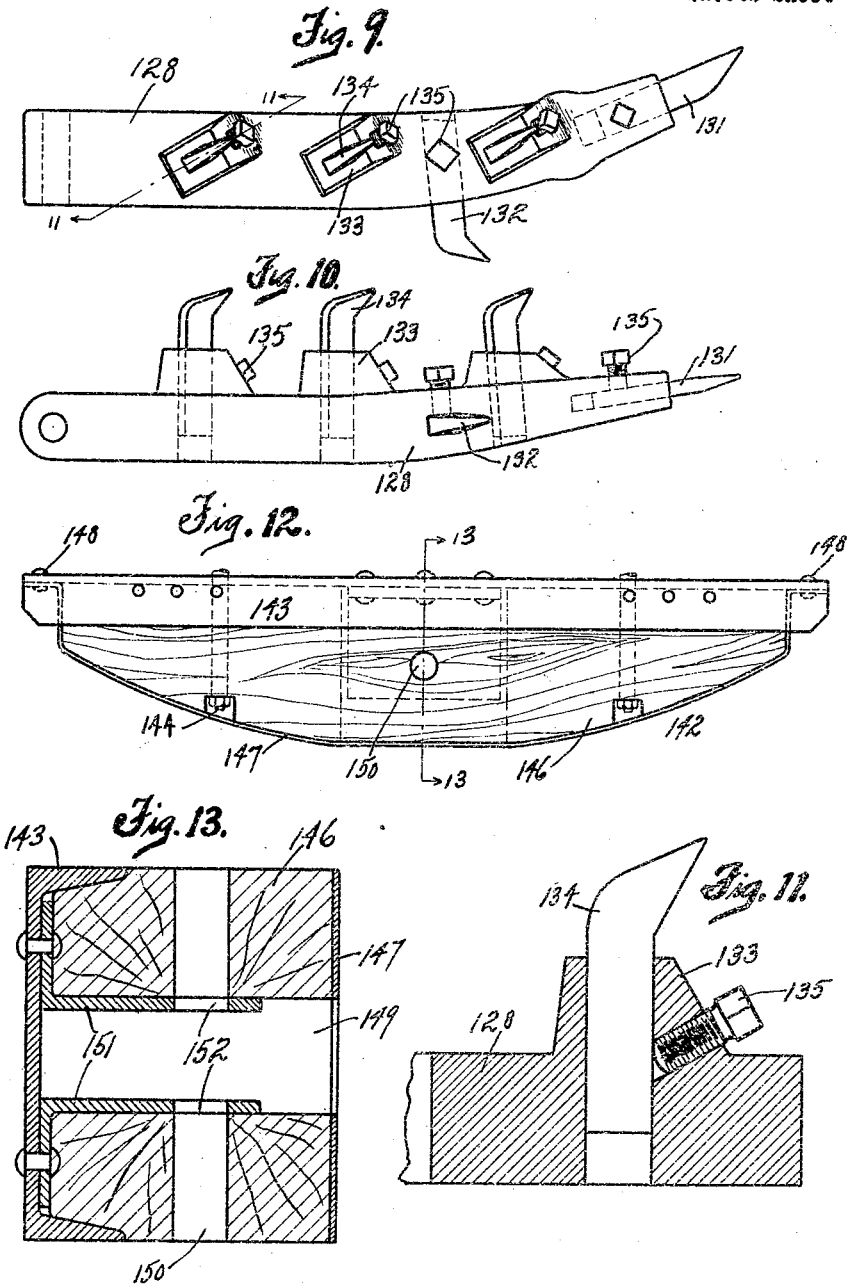

March 1, 1927.
J. F. JOY
1,619,260
LOADING MACHINE
Filed Aug. 2, 1924
12 Sheets-Sheet 10
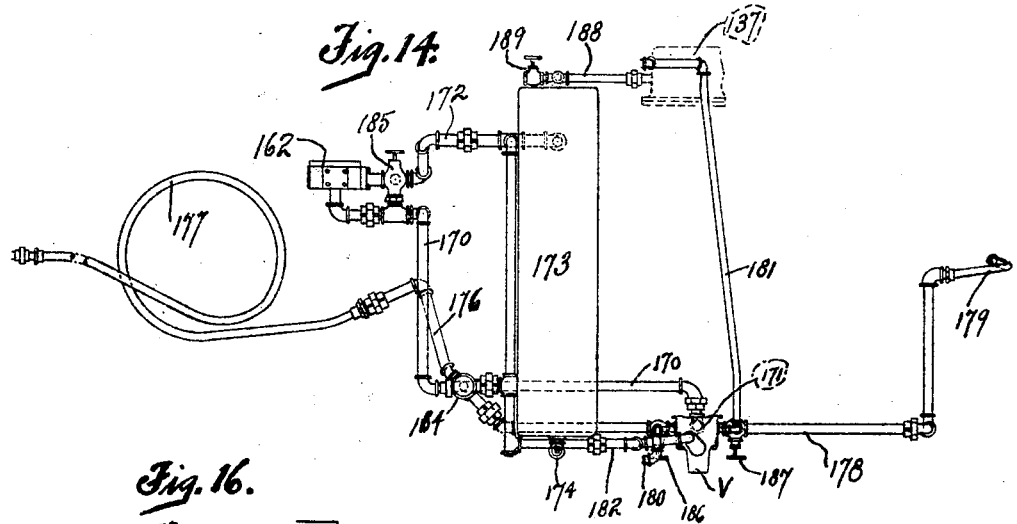
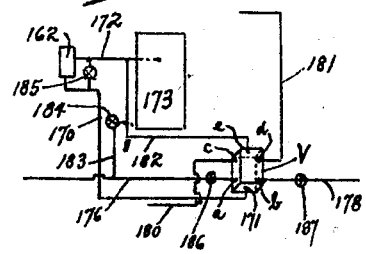
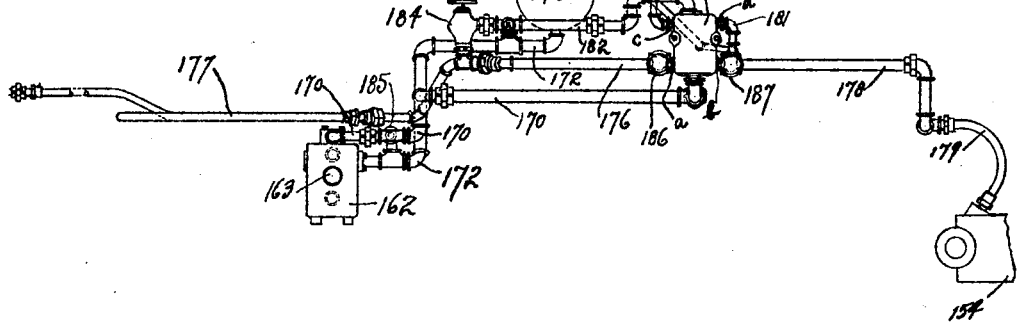
INVENTOR.
Joseph F. Joy
BY J. Stanley Burch
ATTORNEY.

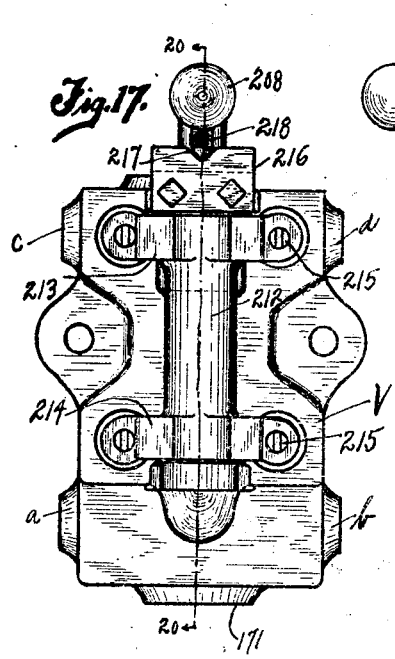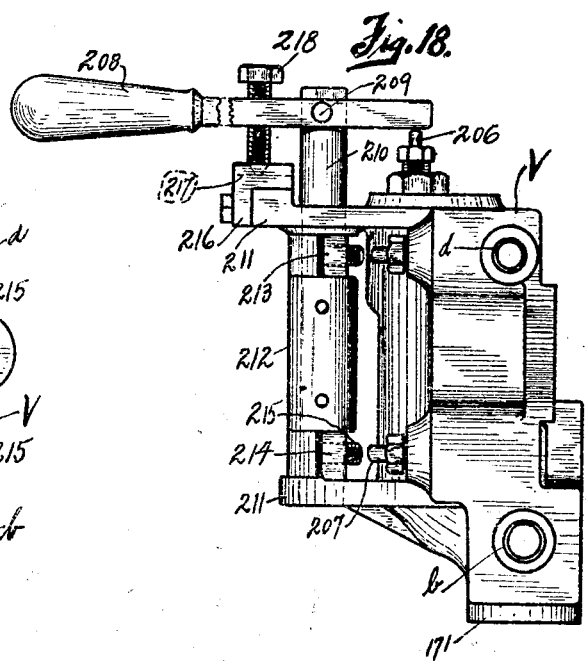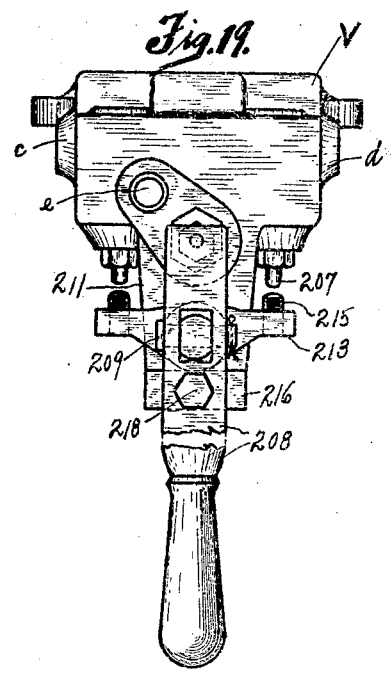

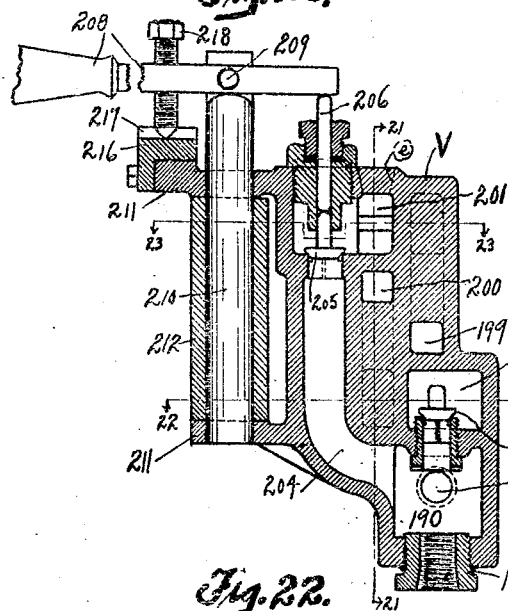

Patented Mar. 1, 1927.

1,619,260

UNITED STATES PATENT OFFICE.

JOSEPH F. JOY, OF FRANKLIN, PENNSYLVANIA, ASSIGNOR, BY MESNE ASSIGNMENTS, TO JOY MANUFACTURING COMPANY, OF FRANKLIN, PENNSYLVANIA, A CORPORATION OF DELAWARE.

LOADING MACHINE.

Application filed August 2, 1924. Serial No. 729,833.

This invention relates to certain new and useful improvements in loading machines, and has particular reference to machines of the type set forth in my co-pending application for United States Letters Patent filed March 3rd, 1924, Serial No. 696,689.

An object of the invention is to provide an automotive loading machine of the above kind whose parts are compactly arranged and which embodies a horizontally swinging rear or loading conveyor, whereby cars may be loaded with facility whether alined with the machine or not, and whereby the machine may be readily moved about in the mine where space is restricted.

Another object is to provide reliable means for raising the front and rear conveyors or conveyor sections and for horizontally swinging said rear conveyor.

Still another object is to provide a machine of the above kind having a well balanced arrangement of parts and having provision for effectively driving all parts to be driven from a single motor.

A further object is to generally improve the construction of machines of the above kind, particularly as to durability, whereby the same may withstand the severe service required of the same underground.

A still further object is to provide in a machine of the above kind embodying a self-propelled chassis having endless flexible traction elements, an improved power transmission gearing between said traction elements and the motor whereby the machine may be propelled in either direction at selective speeds without reversing the motor, whereby the machine may be readily steered or pivotally turned upon one of said tractive elements as the pivotal point, when said pivotally utilized point is caused to be stationary and the other tractive element is caused to be operative, and whereby the front end of the machine may be kept at will in loading proximity to the coal to be loaded.

Another object is to provide effective power means for selectively raising the front and rear conveyors and horizontally swinging the rear conveyor, and to provide simple manually operable means for controlling the operation of such power means as desired.

Other objects will become apparent as the nature of the invention is better understood, and the same consists of the novel form, combination and arrangement of parts hereinafter more fully described, shown in the accompanying drawings and claimed.

In the accompanying drawings forming part of this application and in which like reference characters indicate similar parts throughout the several views, Fig. 1 is a view in side elevation of the rear portion of the machine, partly broken away, and, Fig. 1ª is a similar view of the forward portion of the machine, with parts omitted for sake of clearness; this figure and Fig. 1 together show substantially the complete machine in side elevation.

Fig. 2 is a top plan view of the rear portion of the machine, partly broken away and with parts removed for sake of clearness, and Fig. 2ª is a similar view of the forward portion of the machine; this figure and Fig. 2 together show substantially the complete machine in top plan view.

Fig. 3 is an enlarged fragmentary view of the hopper and adjacent parts, partly broken away and in horizontal section and partly in top plan.

Fig. 4 is a vertical transverse section of the machine taken substantially on the line 4—4 of Fig. 3, with parts removed for sake of clearness.

Fig. 5 is a fragmentary horizontal sectional view taken substantially on line 5—5 of Fig. 4, with parts removed.

Fig. 8 is a diagrammatic plan view illustrating the driving connections between the motor and transverse driven parts located forwardly and rearwardly thereof.

Fig. 9 is an enlarged top plan view of the finger or digging member of one of the gathering arms.

Fig. 10 is a side elevation of the device shown in Fig. 9.

Fig. 11 is an enlarged section taken on line 11—11 of Fig. 9.

Fig. 12 is a top plan view of the bumper.

Fig. 13 is an enlarged section taken on line 13—13 of Fig. 12.

Fig. 14 is a top plan of the hydraulic system for the conveyor raising and swinging jacks, the component parts of the system being shown in the relation they assume when installed on the machine.

Fig. 15 is a side elevation of the system shown in Fig. 14.

Fig. 16 is a diagrammatic view, partly in plan and partly in perspective, of the system shown in Figs. 14 and 15.

Fig. 17 is a front elevational view of the main control valve for the hydraulic system.

Fig. 18 is a side elevational view of the device shown in Fig. 17.

Fig. 19 is a top plan view thereof.

Fig. 20 is a vertical section taken substantially on line 20—20 of Fig. 17.

Fig. 21 is a vertical section taken on line 21—21 of Fig. 20.

Fig. 22 is a horizontal section taken on line 22—22 of Fig. 20.

Fig. 23 is a horizontal section taken on line 23—23 of Fig. 20.

Figure 7:
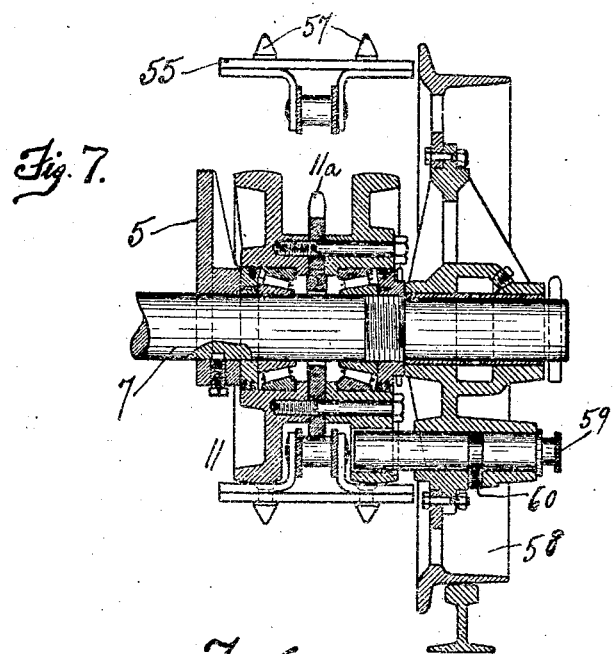
Fig. 7 is a fragmentary sectional view taken on line 7—7 of Fig. 5.

Referring more in detail to the drawings, the present invention embodies a self-propelled chassis, the frame of which includes side rails —5— having upright frame plates or pedestals —6— rigidly secured upon the forward portions thereof in spaced parallel relation. The side rails —5— have pairs of transversely alined openings in which are secured four transverse axles —7—, —8—, —9— and —10— whose ends project outwardly beyond the rails —5—. Journaled and suitably retained upon the inner parts of the projecting portions of the axles —7— and —10— are combined sprocket wheels and guiding and supporting rollers —11—, and journaled upon the ends of axles —8— and —9— are guiding and supporting rollers —12—. It is noted that the axles —7— and —10— are disposed in a plane above the plane in which the axles —8— and —9— are disposed. As shown in Fig. 7, the elements —11— are preferably composed of pairs of roller sections bolted against opposite sides of an intermediate sprocket wheel section —11ª—.

Rigidly mounted between and connecting the forward portions of the side rails —5— is a motor —14—, preferably electrical, having a longitudinally arranged power shaft with a forwardly projecting end portion —14ª— and a rearwardly projecting end portion —14ᵇ— (Fig. 8). A spur pinion —15— is secured on the rear end of the power shaft of the motor —14— and is disposed above and meshes with a spur gear —16— which is fixed on the forward end of a longitudinally arranged shaft —17— as shown in Figs. 5 and 8. A housing —18— is mounted between and rigidly connects the rear end portions of the side rails —5— as shown in Figs. 4 and 5, and within the forward portion of this housing is a variable speed reversing gearing, while within the rear portion of said housing is a differential gearing. The variable speed reversing gearing embodies a pair of transversely arranged shafts, the forward one of which as at —19— has the casings —20— and —21— of multiple-disk friction clutches secured on the end portions thereof. These friction clutches also embody hubs which are journaled on the shaft —19— and whose adjacent ends are provided with rigid bevel gears —22— and —23— both of which constantly mesh with a bevel pinion —24— secured on the rear end of shaft —17—. The casing —20— is formed with a relatively small spur gear —25— and the casing —21— has a larger spur gear —26— rigid therewith. The shaft —19— has an axle bore in which is slidably arranged a rod —27—, and secured to the inner end of this rod is a cross bar —28— whose ends project outwardly through an elongated slot provided in the shaft —19— between the gears —22— and —23—. The ends of the cross bar —28— pass into openings of a collar —29— that is slidably mounted on the shaft —19—, so that longitudinal sliding movement of the rod —27— is transmitted to the collar —27— for a purpose that will presently become apparent. Disks —30— are loosely disposed on the shaft —19— at opposite sides of the collar —29— and they carry laterally projecting pins —31— which project into the casings —20— and —21—. It will thus be seen that when the collar —29— is disposed midway between the gears —22— and —23—, the disks of the friction clutches will slip relative to each other, so that rotation of said gears will not be transmitted to the casings —20— and —21—. On the other hand, when the rod —27— is moved inwardly, the pins —31— of one of the disks —30— will compact the friction disks in the housing —20— and thereby cause the rotation of gear —22— to be transmitted to said housing —20— and the gear —25—, while, when the rod —27— is moved outwardly, the rotation of gear —23— is transmitted to the housing —21— and the gear —26—. The rod —27— may be slid longitudinally by means of a hand lever —32— (Fig. 1) suitably connected to a rock shaft —33— that is journaled in a bearing cap —34— and that has a fork —35— secured thereon which is operatively associated with the rod —27— as shown in Figs. 4 and 5.

The rear shaft —36— of the variable speed reversing gearing, similarly to the forward shaft —19—, has its ends journaled in suitable bearings at the sides of the housing —18—, and journaled upon one end portion of the shaft —36— is a large spur gear —37— that meshes with the gear —25—, while a small spur gear —38— is journaled on the other end portion of shaft —36— and meshes with the gear —26—. A spur pinion —39— is slidably pinned on the shaft —36— and has clutch elements on the ends thereof as at —40— for selective cooperation with similar clutch elements —41— formed on the inner sides of gears —37— and —38—. The clutch elements —40— may be simultaneously disengaged from the elements —41— of both of the gears —37— and —38—, as shown in Fig. 5, and the movement of the pinion —39— may be effected by means of a rod —42— that is slidable in an axial bore of shaft —36— and that has its inner end connected to pinion —39— by means of a cross bar or pin —43— whose ends extend through a longitudinally elongated slot in shaft —36— and into openings of gear —39—. The outer end of rod —42— is operatively associated with a fork —44— of a lever —45— whereby said rod —42— may be manually moved, and means such as a spring latch as at —46—, may be provided for holding the lever —45— in any position it may be set. By various manipulations of the levers —32— and —45—, the pinion —39— may be driven at two different speeds in either direction.

The differential gearing, denoted generally at —47—, is of conventional form and operatively connects a pair of alined transverse shaft sections —48— and —49—, the said differential gearing embodying a ring gear —50— that meshes with the pinion —39—. Secured upon the outer ends of the shafts —48— and —49— are sprocket wheels —51— and —52—, each of which is alined with the sprocket wheel members —11ª— at the adjacent side of the machine. Mounted upon the outer hub portions of the sprocket wheels —51— and —52— are brake drums —53— and —54— having flexible split brake bands —53ª— and —54ª—. The variable speed reversing gearing and the differential gearing run in a bath of oil within the housing —18—. Passing around the rollers —11— and —12— and the sprockets —51— and —52— at each side of the machine is an endless flexible traction element or so-called caterpillar tread —55— of the kind set forth in my abovementioned application. Suitable spring means as generally denoted at —56— in Fig. 1ª are provided for yieldingly urging axle —10— forwardly so as to maintain the traction elements —55— taut.

The traction elements —55— have the calks —57— for the same purpose as the calks —41—, and said elements further include sprocket chains engaging the sprocket wheels —11ª— and —51— and —52—. Also, the axles —7— and —10— project outwardly beyond the traction elements —55— for removable reception of rail wheels —58—. The outer sections of rollers —11— and the rail wheels —58— have transverse openings adapted to be alined for reception of pins —59— whereby the rotation of the rollers —11— will be transmitted to the rail wheels when the latter are used. The pins —59— may be held in place as shown in Fig. 7 by means of screws —60— or the like.

As shown more clearly in Fig. 4, the housing —18— has a cover —61— formed with a central upstanding sleeve —62— in which is journaled an upright shaft —63—, and secured on the lower end of this shaft —63— is a bevel pinion —64— that meshes with the gears —22— and —23—. The cover —61— also has a rigid upwardly and outwardly projecting web —65— upon the margin of which is formed a track —66— for a purpose which will presently become apparent.

The machine embodies a rear conveyor of the well known chain and scraper type, and this conveyor includes a forward hopper section —67—, the bottom of which is formed with a depending central sleeve —68— journaled on the sleeve —62— whereby the hopper may rotate about a vertical axis defined by the shaft —63—. The rear conveyor has a foot shaft —69— as shown in Fig. 3 that is journaled transversely in the forward end of the hopper —67—, and secured on this foot shaft are sprocket wheels —70— about which the usual chains —71— of the endless movable member of said conveyor pass, said endless member including scraper bars —72— which connect the chains —71— at intervals. The chains —71— also pass around the head shaft —73— (Figs. 1 and 2), and means generally denoted at —74— are provided for adjustably and yieldingly urging the head shaft —73— rearwardly for maintaining the endless member of the rear conveyor taut. The hopper —67— has a false bottom —75—, and between the latter and the true bottom of the hopper is formed an oil-tight compartment —76— in which are disposed spur gears —77— and —78— which mesh with each other, the gear —77— being secured on the upper end of shaft —63— and the gear —78— being carried by an upright axle —79— disposed at one side of shaft —63—. The hopper —67— is formed with a side oil-tight compartment —80— in the rear end of which is journaled an upright shaft —81—, and fixed upon the latter shaft is a spur gear —82— that meshes with the gear —78—. A bevel pinion —83— is also fixed on the shaft —81— and meshes with a bevel gear —84— mounted on the rear end of a longitudinally arranged shaft —85— that is journaled horizontally in the compartment —80—. The hub of a multiple-disk friction clutch —86— is journaled on the shaft —85— and has the gear —84— secured thereon, and the casing of said clutch is keyed to shaft —85—. A spring means generally indicated at —87— is provided for normally compacting the disks of the clutch —86— for transmitting the rotation of gear —84— to shaft —85—, and this spring means includes a collar shiftable by a fork on a transverse rock shaft —88— for releasing said clutch and thereby allowing the gear —84— to rotate, when desired, without causing rotation of shaft —85—. A lever —89— is provided on one end of shaft —88— so that the latter may be manually rocked. Secured on the forward end of shaft —85— is a bevel pinion —90— that meshes with a bevel gear —91— secured on the adjacent end of the foot shaft —69—. It will thus be seen that means is provided for driving the rear conveyor from the motor —14— at all times without interfering with the horizontal swinging of said conveyor about the axis of shaft —63—.

The rear conveyor includes a rear section —92— pivoted as at —93— to the forward section or hopper —67— for vertical adjustment or swinging movement, and the usual partition —94— (Fig. 4) is provided above and below which the scraper bars —72— move.

The front conveyor has a gathering mechanism on the forward lower end thereof as disclosed in my above-mentioned application and this conveyor includes a forward inclined frame section —95— whose rear end is hinged to the pedestals —6— as at —96— for vertical swinging movement or adjustment. The front conveyor also embodies a rear frame section —97— which is rigid with and projects rearwardly from the pedestals —6— so as to overhang and discharge into the hopper —67—. Rigidly secured to and connecting the forward portions of the rails —5— and the pedestals —6— is a housing —98— (Figs. 1ª and 6), and journaled transversely in this housing is a horizontal shaft —99— upon which is journaled a bevel gear —100— the hub of which forms the hub of a multiple-disk friction clutch whose housing —101— is keyed on the shaft —99—. The friction disks of the latter clutch are normally compacted by spring means —102— that is manually releasable by means of a rod —103— that is slidable in an axial bore of shaft —99— and that has its inner end connected to the pin disk —104— of said spring means by means of a cross pin or bar —105— whose ends project through an elongated slot in the shaft —99—. A hand lever —106— is provided to facilitate movement of rod —103— through the medium of a fork —107— and means as at —108— may be provided for holding the lever —106— in clutch releasing position.

Figure 6:
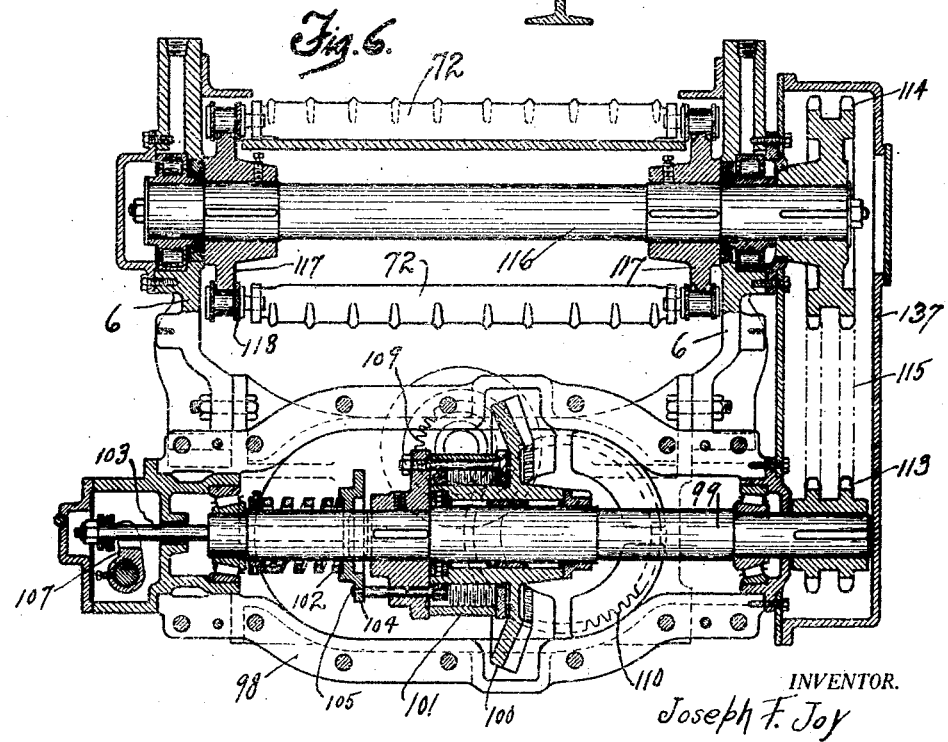
Fig. 6 is a vertical transverse section taken substantially on line 6—6 of Fig. 1ª, parts being removed.

The forward end —14ª— of the shaft of motor —14— has a spur gear —109— fixed thereon, and the latter meshes with a larger gear —110— secured on the rear end of a short longitudinally arranged shaft —111— supported by the housing —98—. A bevel pinion —112— is fixed on the front end of shaft —111— and meshes with the large bevel gear —100—. The shaft —99— projects through one end of the housing —98— and has a double sprocket wheel —113— secured thereon and a double sprocket chain connects this sprocket wheel with a larger double sprocket wheel —114— as indicated at —115— in Fig. 6. The sprocket wheel —114— is secured on one end of a transverse shaft —116— that is journaled in the upper portions of the pedestals —6—, and that has further sprocket wheels —117— fixed thereon. The forward conveyor is of the chain and scraper type embodying an endless member composed of sprocket chains —118— connected at intervals by transverse scraper bars —72— and passing over the sprocket wheels —117— so that when shaft —99— is driven, its rotation is transmitted to drive said endless conveyor member. At the rear end of the conveyor frame section —97— is a transverse shaft —119— (Figs. 1 and 4) having idler guide rollers —120— for the chains —118—, the shaft —119— having adjusting means —121— for maintaining the endless member of the forward conveyor taut.

Means including a hand lever —122— is provided for selectively tightening or simultaneously loosening the brake bands —53ª— and —54ª— to permit steering of the machine, not only for the purpose of adapting the machine to be conveniently and effectually steered when travelling from place to place but—from the operating standpoint— the more important purpose of moving the gathering end of the forward conveyor into actuative and operative relation to the coal to be attacked and moved into or upon said lower conveyor. By means of such automotive construction it is possible to employ a very rigid, substantial, and durable connecting means between the rearward end of said conveyor and its carrying structure, a connection which is absolutely rigid, horizontally considered, and still provides for the necessary swing and adjustment of the forward gathering end of said conveyor in order to effect its accessibility to the coal to be loaded.

The forward conveyor has a driven foot shaft rotatably geared to crank disks —123— as disclosed in my aforesaid application, and these disks rest upon the gathering head apron or shoe —124— and upon the platforms —125— (Fig. 2ª).

The machine embodies a gathering mechanism including gathering arms, each composed of a bracket member —126— pivoted as at —127— to the adjacent disk —123—, and a finger —128— pivoted to the bracket —126— for limited vertical movement. The usual guides —129— and guide bars —130— are provided to cause the fingers —128— to move in substantially reniform orbital paths when the disks —123— are rotated. The finger member of each gathering arm is of pick blade form having a removable cutter bit for the point or tip thereof as at —131— and provided with a transverse horizontal opening in which is secured a removable auxiliary finger or cutter bit —132—. The fingers —128— are further provided with hollow bosses —133— upon the upper sides thereof in surrounding relation to vertical openings of said fingers and in which upstanding obliquely disposed cutter bits —134— are removably secured. Screws —135— may be utilized to secure the bits —131—, —132— and —134— in place.

As shown in Figs. 1 and 3, the rear portion of the hopper —67— has antifriction rollers —136— arranged to run on the track —66— and thereby insure easier turning of the hopper or horizontal swinging of the rear conveyor. The compartments —76— and —80— are adapted to be filled with oil and likewise for the housing —98— and a gear casing —137— provided for the sprocket gearing —113—, —114—, —115—.

Suitable guards —138— are provided to protect the operator from being injured by the traction elements —55— etc., and the electric feed cable —139— (Fig. 2ᵃ) is preferably connected to a safety switch —140—, mounted on the under side of the gathering head, before passing to the motor —14— and an electric controller —141— provided for the latter.

In the use of the present invention, the cars to be loaded are run under the rear conveyor section —92— to receive the coal discharged by the latter, and a bumper —142— is provided at the rear end of the chassis of the machine to protect the latter if bumped by such cars. This bumper comprises a channel bar —143— (Figs. 1, 2, 3, 12 and 13) bolted as at —144— (Fig. 3) to brackets —145— (Figs. 3 and 5) and in turn receiving and having bolted thereto a wooden or other resilient bumper member —146—. The bumper member —146— is preferably tapered narrower from its center to its ends and has its rear impact-receiving face covered by a protecting strip or plate —147— of metal. The plate —147— has its ends outturned and riveted to the bar —143— as at —148—. A car or a mine locomotive may be coupled to the machine by reason of coupling tongue and coupling pin receiving openings —149— and —150— provided centrally in the members —146— and —147— and to take the strain of the coupling pin off of these members, angle brackets —151— are riveted to the bar —143— and have horizontal flanges disposed in the horizontal opening —149— and formed with transverse apertures —152— alined with the vertical opening —150—.

The conveyor sections —92— and —95— lower by gravity and the upward swinging movement thereof is effected by means including hydraulic jacks —153— and —154—, while horizontal swinging of the rear conveyor is effected by means including hydraulic jacks —155— and —156—. The piston and cylinder of jack —153— are hinged at their outer ends to the conveyor section —92— as at —157— and to a bracket —158— at the rear of the hopper —67— as at —159—, respectively, while the piston of jack —154— is hinged as at —160— to the conveyor section —95— and the cylinder of the latter jack is hinged as at —161— to the casing or housing —98—. This allows the jacks and the conveyor sections —92— and —95— to assume different angular relations as is necessary when the latter are raised or allowed to lower.

Suitably mounted at one side of shaft —17— (Fig. 5) is a conventional hydraulic pump —162— preferably of the rotary geared-piston type and this pump has a transversely disposed drive shaft —163— which has a bevel gear —164— fixed thereon, the gear —164— meshing with a bevel gear —165— journaled on the shaft —17—. The gear —165— has clutch teeth adapted to cooperate with the teeth of a clutch element —166— that is slidably keyed on shaft —17— and that is normally engaged, for causing the pump to be driven, by a spring —167—. The clutch element —166— may be manually released by means of a fork operated by lever —168— (Fig. 1). A casing —169— that encloses gears —164—, —165— and —16— is adapted to hold oil and is secured to the front end of housing —18—.

The pump —162— has an outlet or discharge line —170— that is connected to the bottom inlet —171— of a main control valve —V— of special form that is arranged to be mounted on the right hand pedestal —6—, and the supply line —172— of said pump is connected to the bottom of a reservoir or tank —173—. The tank —173— is supplied with fluid, such as oil, through a filling spout —174— and is bolted in a transversely extending horizontal position against the rear edges of the pedestals —6— beneath the conveyor section —97— and above the motor —14— as at —175— (Fig. 1ᵃ).

The main control valve has five outlet ports, a lower side one of which as at —a— is connected to the rear jack —153— by means of piping —176— that includes a flexible section of high pressure hose —177— which is loosely coiled about the hopper sleeve —68— so as to not interfere with the swinging of the jack or the turning of said hopper when the rear conveyor is swung horizontally. The other lower side one of the outlet ports of valve —V— as at —b— is connected to the front jack —154— by means of piping —178— that includes a flexible section of high pressure hose —179— so that swinging of the jack —154— is freely permitted. An upper side outlet port —c— is connected by piping —180— to the right hand jack —156—, while the other upper side port —d— is connected by piping —181— to the left hand jack —155—. The top remaining port —e— is connected by piping —182— to the supply line —172—, and a by-pass —183— is provided between the piping —176— and the piping —182—, in which by-pass is disposed a spring seated check or safety relief valve —184— of conventional form. A similar by-pass is provided between pipings —170— and —172— in which is disposed a similar safety relief valve —185—, and manually operable shut-off or needle valves —186— and —187— are respectively provided in the pipings —176— and —178—. A connection —188— (Fig. 14) is provided between the tank —173— and the casing —137— so that the latter will be kept full of oil, and this connection —188— has a branch provided with a shut-off valve —189— that may be opened to the atmosphere for relieving the tank —173— of air.

The control valve —V— embodies a casing having a chamber —190— in the lower portion thereof into which the ports —171—, —a— and —b— open and a chamber —191— located above the chamber —190— and communicating with the latter through a central port closed by a downwardly seating check valve —192—. A pair of chambers —193— and —194— are formed in the casing in side by side relation forwardly of chamber —191— and ports, controlled by forwardly seating valves —195— and —196—, provide communication between the chambers —193— and —194— and opposite ends of chamber —191—, the valves —195— and —196— being spring-seated (Fig. 22). Formed in the upper rear part of the valve casing are chambers —197— and —198—, the former of which communicates with chamber —194— through a passage —199—, and the latter of which communicates with chamber —193— through a passage —200—. The valve casing has a further chamber —201— located in front of chambers —197— and —198— and communicating with the latter through end ports controlled by spring-seated and forwardly seating valves —202— and —203—. A passage —204— is provided between the chambers —190— and —201— and is controlled by a downwardly seating valve —205— which has a valve stem —206— projecting through a stuffing box in the top wall of the valve casing. The valves —195—, —196—, —202—, and —203— have similar valve stems —207— which project through stuffing boxes in the front wall of the valve casing, and manually operable means are provided for cooperation with the valve stems —206— and —207— whereby the valve —205— may be closed and held closed without opening any of the valves —195—, —196—, —202— and —203—, whereby the valves —195— and —202— may be simultaneously opened while the valves —196— and —202— are allowed to remain closed, or vice versa, and whereby the valve —205— is closed and held closed when the valves —195— and —202— or the valves —196— and —203— are opened. This means embodies a handle —208— pivoted for vertical movement as at —209— on the upper end of a rock shaft —210— that is vertically journaled in alined openings of superimposed ears —211— rigid with the front of the control valve casing. The inner or rear end of the handle —208— overlies the valve stem —206— so that when the outer end of this handle is lifted the valve —205— is closed. Secured on the shaft —210— is a sleeve —212— having rigid upper and lower cross arms —213— and —214—, and the ends of said cross arms are provided with adjustable screws —215—. The screws —215— of cross arm —213— coincide with the valve stems of valves —202— and —203— and those of the cross arms —214— with the stems of valves —195— and —196—. It will thus be seen that when the handle —208— is swung to one side the valves —195— and —202— will be simultaneously opened and that when it is swung to the other side the valves —196— and —203— will be simultaneously opened. An angle plate —216— is secured to the upper ear —211— and has a groove —217— radial to the axis of shaft —210—, which groove receives the lower end of a screw —218— when the handle —208— is released to allow the valves —195—, —196—, —202— and —203— to close and the valve —205— to open, said screw —218— being vertical and adjustably threaded through the handle —208—. In this manner the handle must be lifted to release the screw —218— from the groove —217— and to close the valve —205— before said handle can be swung sidewise to open the valves —195— and —202— or —196— and —203—, for a purpose that will presently become apparent.

Guide pulleys —219— are journaled on the rear outer ends of the pistons of jacks —155— and —156— and the latter are rigidly mounted in a horizontal position at opposite sides of the conveyor section —97—. A pair of superimposed pulleys —220— are mounted on each pedestal —6—, and a cable —221— is passed over the pulleys —219— and —220— and wound about a horizontal drum —222— rigid with the bottom of the hopper —67— so that the selective rearward movement of the pistons of jacks —155— and —156— will cause the rear conveyor to swing horizontally to the desired side. The ends of the cable —221— are attached to the forward ends of the cylinders of jacks —155— and —156— as at —223— (Fig. 2ª), and the drum —222— (Fig. 4) is concentric with the shaft —63— and sleeves —62— and —68—.

The controlling handles and levers or the like are all located at the same side of the machine so that the operator may readily manipulate them. By reason of the fact that the rear conveyor can be swung horizontally and its rear section —92— can be adjusted vertically, loading of cars is made possible irrespective of the position or height of the latter.

In the use of the machine, the rail wheels —58— are secured on the axles —7— and —10— so that the machine may be propelled on the mine tracks to the working place. By operating the controller —141—, the motor —14— may be started so as to drive the shaft —17— and gears —22— and —23—. In travelling up a grade, the machine is propelled forwardly in low gear by manipulating levers —32— and —45— so as to compact the friction disks in the clutch housing —20— and to engage the clutch teeth —40— with the teeth —41— of the large spur gear —37—. If the machine is moved forward down grade or on a comparatively level place, high gear may be utilized for more rapidly reaching the working place, by leaving the friction disks of the housing —20— compacted and engaging the clutch teeth —40— of gear —39— with the clutch teeth —41— of the spur gear —38—. The machine may be moved backward in low gear by clutching the gear —23— to the housing —21— and the gear —39— to gear —37—, while high speed reverse may be obtained by clutching the gear —39— with gear —38— when the gear —23— is clutched to the housing —21—. Upon approaching the working place where the track rails end, the track wheels —58— are removed and the machine is then run onto the mine floor supported by the traction elements —55—. The lever —122— is manipulated for selectively tightening the brake bands —53ª— and —54ª— to effect steering of the machine as disclosed in my above-mentioned application, whereby the gathering head may be directed to attack the standing coal as found desirable. When the machine is moved from place to place, the front conveyor section —95— and its gathering head are, of course, raised, and this is effected by lifting the handle —208— of valve —V— and opening valve —187— when the gear —165— is clutched to shaft —17— so that the pump —162— is driven. Under these conditions, the fluid under pressure passes from pump —162— through piping —170—, valve chamber —190—, and piping —178— to the front jack —154—, the valve —205— being held closed to prevent the fluid from passing through passage —204—, chamber —201—, port —e— and piping —182—. The fluid can, at this time, pass into chamber —191— but will act to close valves —195— and —196— so that it can go no further. As shown in my above mentioned application, means may be provided to limit the upward movement of the conveyor section —95—, and when this limit is reached, the excess pressure in the line —170— is relieved through valve —185— to piping —172— to avoid breakage of parts in case the pump is not stopped or the handle —208— is not released in time. The conveyor section —95— may be held raised by closing valve —187—, and may be allowed to lower by opening the latter when the handle —208— is released, the fluid then flowing from jack —154— through passage —204—, chamber —201—, port —e— and piping —182— to the tank —173—. The same operation takes place when the rear conveyor section —92— is raised and lowered, except that valve —186— is then manipulated instead of valve —187— so that the fluid flows to and from the rear jack —153— through piping —176—. The upward movement of the conveyor section —92— is limited by a chain —250— and when the limit is reached, the excess pressure in the piping —176— is relieved to piping —182— through by-pass —183— and the relief valve —184—. In order to cause the rear conveyor to swing to the right, the valve handle —208— is lifted to close valve —205— and is then swung to the right to open valves —196— and —203—. When this is done, the fluid passes from pump —162— through piping —170—, valve chambers —190—, —191— and —194—, passage —199—, chamber —197—, port —c—, and piping —180— to the right hand jack —156— so that the piston of the latter is projected for exerting a pull on the cable —221— at the right hand side of the machine. At the same time, the cable at the left hand side is wound on the drum —222— and causes the piston of the left hand jack —155— to retract into its cylinder, the fluid behind the latter piston exhausting through piping —181— into chamber —198— and past the open valve —203— into chamber —201— from whence it passes through port —e— and piping —182— to tank —173—. To swing the rear conveyor to the left, the valve handle —208— is lifted and then swung to the left to open valves —195— and —202—.

When this is done, the fluid passes through piping —170—, valve chambers —190—, —191— and —193—, passage —200—, chamber —198—, port —d— and piping —181— to the left hand jack —155— so that the piston of the latter is projected for exerting a pull on the cable —221— at the left hand side of the machine. At the same time, the cable at the right hand side is wound on drum —222— and causes the piston of the right hand jack to retract, the fluid behind the latter piston exhausting through piping —180—, into chamber —197— and past the open valve —202— into chamber —201—, from whence it passes through port —e— and piping —182—to tank —173—. The pistons of jacks —155— and —156— are preferably spring-projected to maintain the cable —221— taut. Advantages of vertically adjustable and horizontally swinging conveyors in loading machines are numerous and some of the advantages are set forth in my United States Letters Patent Nos. 1,306,064, June 10th, 1919, and 1,445,084, Feb. 13th, 1923.

A step or platform —251— is supported by the axles —8— and —9— at the right hand side of the machine to accommodate the operator of the machine when moving the latter from one working place to another.

When the gathering head has been properly directed to the coal, the lever —106— is released so as to allow the spring means —102— to cause the friction disks of clutch housing —101— to be compacted, thereby transmitting the rotation of gear —100— to shaft —99— and through the sprocket gearing to shaft —116—. The front conveyor and the gathering mechanism is thus rendered operative so as to dislodge and gather the coal and discharge it into the hopper —67—. By operating lever —89—, the rotation of gear —84— is transmitted to foot shaft —69— of the rear conveyor so that the latter transfers the coal from hopper —67— and discharges it into cars as they are placed at the rear of the machine. The friction clutches will slip when overloaded so as to prevent damage to the various parts.

Minor changes may be made without departing from the spirit and scope of the invention as claimed.

What I claim as new is:

1. In a coal loading machine, in combination, an automotive organization comprising among its elements a carrying and mounting structure consisting of a single, rigid frame, suitable propelling mobility means for said organization upon which said frame is rigidly mounted, a single power unit carried by said frame adapted to supply power for the operation of said automotive organization and the various operating elements of said machine, a delivery conveyor carried upon and wholly supported by said frame adapted and operable by power derived from said power unit to deliver coal to a car, a gathering and elevating conveyor carried upon and wholly supported by said frame adapted and operable by power derived from said power unit to gather coal from the floor of a mine and to transfer same to and upon said delivery conveyor, and directing and adjusting means, operable by power derived from said power unit adapted to advance, direct and adjust said gathering and elevating conveyor into gathering relation to the coal to be gathered and elevated thereby.

2. In a coal loading machine, in combination, an automotive organization comprising among its elements a carrying and mounting structure consisting of a single, rigid frame, suitable propelling mobility means for said organization upon which said frame is rigidly mounted, a single power unit carried by said frame adapted to supply power for the operation of said automotive organization and the various operating elements of said machine, a delivery conveyor carried directly upon and wholly supported by said frame adapted and operable by power derived from said power unit to deliver coal to a car, a gathering and elevating conveyor carried directly upon and wholly supported by said frame in horizontally-rigid relation thereto adapted and operable by power derived from said power unit to gather coal from the floor of a mine and to transfer same to and upon said delivery conveyor, said propelling and mobility means being adapted and operable by means of power derived from said power unit to advance and laterally direct said gathering and elevating conveyor into gathering relation to the coal to be gathered and elevated thereby.

3. In a coal loading machine, in combination, an automotive organization comprising among its elements a carrying and mounting structure consisting of a single, rigid frame, suitable propelling mobility means for said organization upon which said frame is rigidly mounted, a single power unit carried by said frame adapted to supply power for the operation of said automotive organization and the various operating elements of said machine, a delivery conveyor carried upon and wholly supported by said frame adapted and operable by power derived from said power unit to deliver coal to a car, a gathering and elevating conveyor carried directly upon and wholly supported by said frame adapted and operable by power derived from said power unit to gather coal from the floor of a mine and to transfer same to and upon said delivery conveyor, said gathering and elevating conveyor being pivotally attached at its upper end to said frame whereby its lower gathering end is adapted to have vertical adjustability, and means actuated by energy developed by said power unit arranged to effect vertical adjustment of said lower end of said conveyor.

4. In a coal loading machine, in combination an automotive organization comprising among its elements a carrying and mounting structure consisting of a single, rigid frame, suitable propelling mobility means for said organization upon which said frame is rigidly mounted, a single power unit carried by said frame adapted to supply power for the operation of said automotive organization and the various operating elements of said machine, a delivery conveyor carried upon and wholly supported by said frame, adapted and operable by means of power derived from said power unit to deliver coal to a car, a gathering and elevating conveyor carried upon and wholly supported by said frame adapted and operable by means of power derived from said power unit to gather coal from the floor of a mine and to transfer same to and deposit it upon said delivery conveyor, said delivery elevator being pivotally attached at one of its ends to said frame whereby its other end is adapted to have horizontal swinging movement, and means operable by power derived from said power unit to impart said horizontal swinging movement to said elevator.

5. In a coal loading machine, in combination, an automotive organization comprising among its elements a carrying and mounting structure consisting of a single rigid frame, suitable propelling mobility means for said organization upon which said frame is rigidly mounted, a single power unit carried by said frame adapted to supply power for the driving of said mobility elements and various other operating elements of said loading machine, forward and rearward conveyors carried in relatively tandem relation by and wholly supported upon and from said frame, adapted, co-operating and operable by power derived from said power unit to gather coal from the floor of a mine and to deliver same to a car, said conveyors being so mounted upon said frame as to be vertically adjustable at their relatively extreme ends, supplementary supporting and adjusting means for said forward conveyor interposed between said frame and an adjacent portion of said forward conveyor, and supplementary supporting and adjusting means for said rearward conveyor; each of said supplementary means being adapted and operable by means of power derived from said power unit to effect vertical adjustment of said conveyors respectively.

6. In a loading machine, a chassis, forward and rear conveyors mounted in tandem relation on said chassis for elevating material from a point adjacent the ground and discharging it into pit cars or the like, said rear conveyor being pivoted at its forward end to swing horizontally, said forward conveyor having a stationary rear portion overhanging the forward end of the rear conveyor, reciprocating members mounted on opposite sides of the rear portion of the front conveyor, power means for selectively rearwardly moving said reciprocating members, and operative connections between said reciprocating members and the rear conveyor for causing the latter to swing horizontally when either of said reciprocating members is caused to move rearwardly.

7. In a loading machine, a chassis, forward and rear conveyors mounted in tandem relation on said chassis for elevating material from a point adjacent the ground and discharging it into pit cars or the like, said rear conveyor being pivoted at its forward end to swing horizontally, said forward conveyor having a stationary rear portion overhanging the forward end of the rear conveyor, reciprocating members mounted on opposite sides of the rear portion of the front conveyor, power means for selectively rearwardly moving said reciprocating members, and operative connections between said reciprocating members and the rear conveyor for causing the latter to swing horizontally when either of said reciprocating members is caused to move rearwardly, said reciprocating members comprising hydraulic jack pistons.

8. In a loading machine, a chassis, a rear conveyor mounted on the chassis to swing horizontally and including a rear section pivoted to swing vertically, a forward conveyor mounted on the chassis and including a rigid rear section overhanging the forward end of the rear conveyor and having a forward section pivoted to swing vertically, a gathering head on the forward end of said forward conveyor, a hydraulic jack associated with the vertically swinging section of each conveyor to raise the latter, further hydraulic jacks carried by the rear section of the forward conveyor and operatively connected to the rear conveyor for causing the latter to swing horizontally, a single control element for selectively causing operation of the desired one of the last named jacks to swing the rear conveyor to the right or left, at will, and a supplemental control element for controlling the operation of each of said first named jacks whereby the desired one or both of said vertically swinging conveyor sections may be raised, at will.

9. In a coal loading machine, in combination, a dirigible automotive organization comprising a single rigid frame, dirigibly-operative mobility wheels carrying said frame and a motor unit arranged to drive said mobility members; the combination with the foregoing of a gathering-conveyor carried by said frame in laterally-rigid, vertically-flexible relation thereto, a delivery conveyor carried by said frame in both vertically and laterally-flexible relation thereto, and means deriving operative power from said power unit, operative at will to move said conveyors selectively in their respective aforesaid directions of flexibility, the aforesaid dirigibility being utilizable at will to laterally direct said gathering conveyor into gathering and actuating relation to the material to be moved thereby.

10. In a coal loading machine, in combination, a dirigible, reversible automotive organization comprising a single rigid frame, dirigibly and reversibly-operative mobility members carried by said frame and a motor unit arranged to drive said mobility members; the combination with the foregoing of a gathering-conveyor carried by said frame in laterally-rigid, vertically-flexible relation thereto, a delivery-conveyor carried by said frame in both vertically and laterally-flexible relation thereto and means deriving operative power from said power unit operative at will to move said conveyors selectively in their respective aforesaid directions of flexibility, the aforesaid dirigibility and reversibility being utilizable at will to advance to, withdraw from and laterally direct said gathering conveyor into gathering and actuating relation to the material to be moved thereby.

In testimony whereof I affix my signature.

JOSEPH F. JOY.